(12) United States Patent
Zhang et al.

(10) Patent No.: US 6,839,246 B1
(45) Date of Patent: *Jan. 4, 2005

(54) SELF-DRIVING CIRCUIT FOR A DC/DC CONVERTER

(75) Inventors: Xingzhu Zhang, Shenzhen (CN); Xiaopeng Dong, Shenzhen (CN)

(73) Assignee: Emerson Network Power Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 10/169,238

(22) PCT Filed: Jan. 11, 2000

(86) PCT No.: PCT/CN00/00412

§ 371 (c)(1),
(2), (4) Date: Jun. 26, 2002

(87) PCT Pub. No.: WO01/48902

PCT Pub. Date: Jul. 5, 2001

(30) Foreign Application Priority Data

Dec. 27, 1999 (CN) .................................. 99126693 A

(51) Int. Cl.⁷ .................................................. H02M 3/335
(52) U.S. Cl. .............................. 363/21.06; 363/21.03; 363/127
(58) Field of Search ................. 363/16, 21.02, 363/21.03, 21.06, 21.14, 127

(56) References Cited

U.S. PATENT DOCUMENTS

| 4,403,269 | A  | * | 9/1983  | Carroll ........................ 361/91.7 |
| 4,754,385 | A  | * | 6/1988  | McDade et al. ............... 363/16 |
| 4,768,141 | A  | * | 8/1988  | Hubertus et al. .............. 363/16 |
| 5,047,911 | A  | * | 9/1991  | Sperzel et al. ............ 363/56.01 |
| 5,343,383 | A  | * | 8/1994  | Shinada et al. .............. 363/127 |
| 5,400,239 | A  |   | 3/1995  | Caine ........................... 363/21 |
| 5,883,793 | A  | * | 3/1999  | Farrington .................... 363/16 |
| 6,181,578 | B1 | * | 1/2001  | Fronk ....................... 363/21.06 |
| 6,243,278 | B1 | * | 6/2001  | Jacobs ......................... 363/127 |
| 6,324,077 | B1 | * | 11/2001 | Lopresti et al. ................ 363/16 |
| 6,377,477 | B1 | * | 4/2002  | Xie et al. ................. 363/21.14 |
| 6,563,719 | B1 | * | 5/2003  | Hua et al. ................. 363/21.06 |
| 6,580,626 | B2 | * | 6/2003  | Takegami ..................... 363/97 |
| 6,583,993 | B2 | * | 6/2003  | Hua ......................... 363/21.06 |
| 6,628,532 | B1 | * | 9/2003  | Rinne et al. ............. 363/21.06 |
| 6,678,172 | B1 | * | 1/2004  | Zhang et al. ............. 363/21.14 |

FOREIGN PATENT DOCUMENTS

EP 0 954 088 A1 11/1999 ............ H02M/3/28

* cited by examiner

Primary Examiner—Jeffrey Sterrett
(74) Attorney, Agent, or Firm—Ladas & Parry LLP

(57) ABSTRACT

The present invention provides a self-driving circuit of a low voltage, large current, and high power density DC/DC converter. The converter comprises a transformer, power MOS transistors (S), output rectification portion (SRb 1, SR2), filter portion and demagnetizing portion. The first configuration of the self-driving circuit consists of Da, Ra, Ca, Qa for self-driving SR2; and the second configuration consists of Da, Ra, Sa, a delay driving circuit and an isolation differential circuit, for self-driving SR2. The self-driving circuit of the present invention may reduce the cross-conductive loss, and increase the converting efficiency.

14 Claims, 6 Drawing Sheets

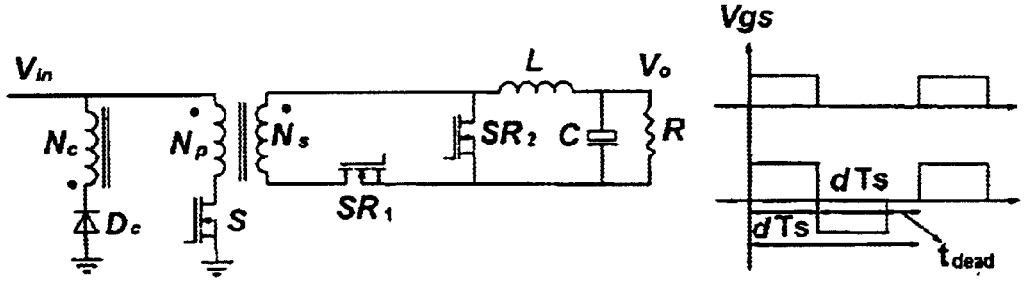
Fig. 1a
(Prior Art)
Fig. 1b
(Prior Art)
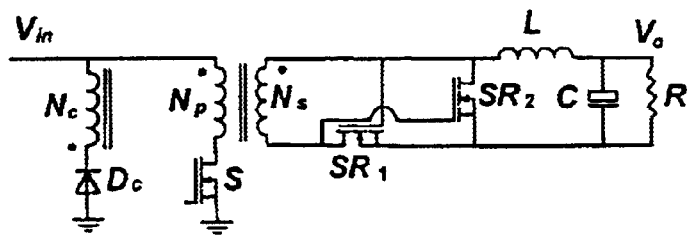
Fig. 2
(Prior Art)
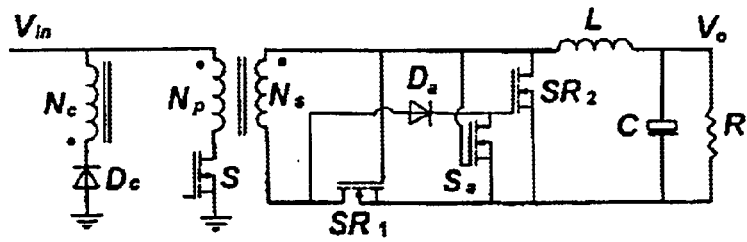
Fig. 3a
(Prior Art)

Isolating Differential Circuit

SELF-DRIVING CIRCUIT FOR A DC/DC CONVERTER

The present invention relates to a self-driving circuit for a DC/DC converter of low voltage, high current, and high power density.

With the rapid development of high technologies, such as, communications, remote sensing, electronic computers, and electronic instrument, the requirement of power supplies of such electronic equipment has increased accordingly. DC/DC converter of low voltage, high current, and high power density is the core technology of the power supplies for supper integrated circuits and high-speed central processors. To meet high efficiency and high power density requirement, the auxiliary (secondary) side of such DC/DC converter shall use synchronous rectifying transistor MOSFET in place of Schottky diode for rectification in order to reduce power loss. However, for a synchronous rectifying MOSFET, the gate thereof needs a corresponding drive circuit to stimulate. In order to avoid cross-conductive losses, the requirement of timing of the drive circuit is high. The existing drive circuits utilize external driving technology, but its control is too complicated and the cost is high.

FIG. 1a shows a demagnetized forward stimulating circuit of three windings. The voltage waveform of its secondary side is shown in FIG. 1b. FIG. 2 is a self-driving circuit of the synchronous rectifying MOSFET transistors $SR_1$ and $SR_2$ of the circuit of FIG. 1 that are driven by the voltage waveform of the secondary side. One of the synchronous rectifying transistors $SR_1$ (for rectification) may be directly driven by the voltage waveform of the secondary side of the transformer, while the other synchronous rectifying transistor $SR_2$ (for rectification) cannot be directly driven by the voltage waveform of the secondary side of the transformer. This is because there is a dead interval from the demagnetizing stage to simulating stage in the voltage waveform of the secondary side of the transformer. The existence of this dead interval causes the turn-off of the continuous synchronous rectifying transistor ($SR_2$) for lack of drive during this dead interval. However, in order to maintain the continuity of the inductive current, the body diode of $SR_2$ will become conductive. The characteristics of voltage drop and switching are all poor due to the conduction of the body diode. This may result in increase of power loss and backward recovery loss caused thereby such that the efficiency of the entire transformer decreases dramatically. Therefore, such a main circuit cannot use the direct self-driving technology.

At present, there are two self-driving circuits that can drive the $SR_2$ of FIG. 1a, respectively shown in FIGS. 3a and 3b. In FIG. 3a, a diode Da and a small power MOSFET Sa are used to drive the continuous current $SR_2$. It operates as: when the secondary side voltage becomes negative at top and positive at the bottom, $SR_1$ turns off, and $SR_2$ turns on due to the diode Da. During the dead interval $t_{dead}$, the secondary side voltage becomes zero, Da turns off, and $SR_2$ still turns on because its Vgs does not have any discharging path. When the secondary side voltage becomes positive at top and negative at bottom once again, $SR_1$ and Sa turn on so as to turn off $SR_2$. This circuit can realize $SR_2$ self-driving by using simply two components, but cannot realize the time sequence that $SR_2$ turns off first and $SR_1$ turns off later. Thus, it still has relatively large cross-conductive loss, and may damage $SR_1$ and $SR_2$ if serious. Then the operation of the converter is not reliable. The circuit of FIG. 3b is driven by PWM drive signal of the primary side. After the isolation of the pulse transformer, it drives, respectively, $SR_1$ and Sa at the same phase. Although it realizes $SR_2$ self-driving and ensures that Sa turns on earlier than $SR_1$, thereby reducing the cross-conducting time of $SR_2$ and $SR_1$. However, it does not eliminate completely the cross conductive loss, and the efficiency of the transformer is still hard to increase.

Therefore, the object of the present invention is to solve the existing problem of self-driving technology of the commonly used main circuit of the DC/DC converter of low voltage and high current, and to provide a self-driving circuit that enables minimizing the cross-conductive loss and backward recovery loss, simplifying the structure, and reducing the cost.

The present invention is realized by the following technical embodiment. In the self-driving circuit of the DC/DC converter of the present invention, the rectification portion of the converter comprises synchronous rectifying MOS transistors ($SR_1$) and ($SR_2$), wherein the self-driving circuit is composed of a resister (Ra), a capacitor (Ca), a transistor (Qa) and the diode (Da). The resister (Ra) and the capacitor (Ca) are connected in parallel. An end of the parallel connection is connected with the positive end of the winding (Ns), and the other end thereof is connected with the base of the transistor (Qa). The emitter of the transistor (Qa) is connected with the source of the MOS transistor ($SR_1$), while its collector is connected with the cathode of the diode (Da) and the gate of the MOS transistor ($SR_2$). The anode of the diode (Da) is connected with the negative terminal of the winding (Ns), and its cathode is connected with the gate of the MOS transistor ($SR_2$).

In the other self-driving circuit of the DC/DC converter of the present invention, the rectification portion of the converter comprises synchronous rectifying MOS transistors ($SR_1$) and ($SR_2$), wherein the self-driving circuit is composed of a resister (Ra), a diode (Da), a small power MOS transistor (Sa), a time delay driving circuit, and an isolating differential circuit. The anode of the diode Da is connected with the negative end of the winding Ns and the drain of the synchronous transistor ($SR_1$), and its cathode is connected to the gate of the synchronous rectifying MOS transistor ($SR_1$) and the drain of the small power transistor Sa through the resistor (Ra). An end of the delay driving circuit is connected with an end of the isolating differential circuit, and the other end of the isolating differential circuit is connected with the gate of the small power transistor Sa.

The isolating differential circuit may be composed of the resistance of the windings Npa and Nsa of the transformer, two capacitors, two resisters, and a diode. The resistance of the winding Nsa is connected with the parallel-connected resisters and diode through the capacitors.

The time delay driving circuit is composed of a delay circuit and a driving circuit, wherein an example of the delay circuit is formed by connecting the diode and resister in parallel, and then connected to a ground capacitor in serial.

The MOS transistor ($SR_2$) turns off before the resister ($SR_1$) turns on.

The DC/DC converter is a demagnetized forward converter of three windings (Nc, Np, Ns). The negative end of the winding Np is connected with the drain of the power MOS transistor (S). An end of the delay driving circuit is connected with an end of the isolating differential circuit, and the other end is connected to the gate of the power MOS transistor (S).

The DC/DC converter is a forward converter of resonant clamping. The winding Np and the capacitor (Cc) are connected in parallel, and the n connected with the drain end of the power MOS transistor (S). An end of the delay driving circuit is connected with an end of the isolating differential circuit, and the other end is connected to the gate of the power MOS transistor (S).

The DC/DC converter is a double forward converter of diode clamping. The positive end of the winding (Np) is connected with the source of the power MOS transistor ($S_1$), and the negative end of the winding (Np) is connected with the drain of the power MOS transistor ($S_2$). The anode of the diode (D) is connected with the negative end of the winding (Np), and the cathode is connected with the drain end of the power MOS transistor ($S_1$). The cathode of the diode $D_2$ is connected with the positive end of the winding (Np), and the anode is connected with the source end of the power MOS transistor ($S_2$). An end of the delay driving circuit is connected with an end of the isolating differential circuit, and the other end is connected, respectively, with the gate of the power MOS transistor ($S_1$) and the gate of the power MOS transistor ($S_2$).

The DC/DC converter is a double forward converter of resonance clamping. The positive end of the winding (Np) is connected with the source of the power MOS transistor ($S_1$), and the negative end of the winding (Np) is connected with the drain end of the power MOS transistor ($S_2$). The capacitor (Cc) and the winding (Np) are connected in parallel; the two ends thereof are, respectively, connected with positive and negative ends of the winding (Np). An end of the time delay driving circuit is connected with an end of the isolating differential circuit, and the other end is connected, respectively, with the gates of the power MOS transistors ($S_1$), ($S_2$).

The advantages of the present invention are as follows: for the first circuit, it ensures the conduction of the continuous current SR during the dead interval through the addition of the accelerate circuit and careful selection of Ra, Ca, Qa, and the resistance of the resisters connected in serial at its gate, and at the same time, it maintains the minimum cross-conductive loss and high converting efficiency.

The following embodiments will be discussed in conjunction with the accompanying drawings.

FIG. 1a is a normal demagnetized forward converter circuit of three windings;

FIG. 1b is the waveform of the secondary side voltage of the above circuit;

FIG. 2 is a direct self-driving circuit;

FIG. 3a is a known self-driving circuit;

Figure 3B:
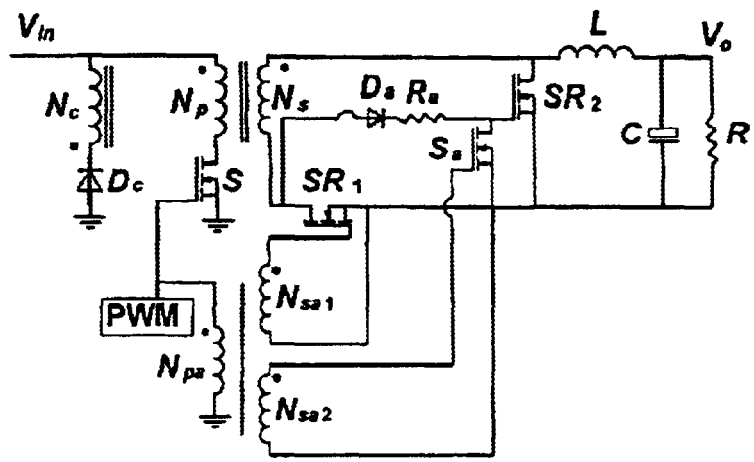
FIG. 3b is another known self-driving circuit.
Figure 4A:
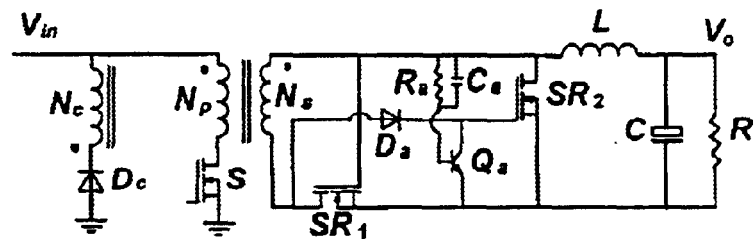
FIG. 4a is the first self-driving circuit of the present invention.

FIG. 4(a) illustrates the first embodiment of self-driving circuit of the present invention used in the demagnetized forward stimulating circuit of three windings. It is a non-isolating self-driving circuit, and is a drive circuit for $SR_2$, that is composed of a diode Da, a resister Ra, a capacitor Ca, transistor Qa. The circuit winding of the transformer Np and Ns are connected through the like ends, and the rectifying MOS transistor is composed of $SR_1$ and $SR_2$.

In the embodiment of the first circuit, when t=$t_1$, the main switch S turns off, Dc, and generates a value of demagnetizing voltage-second with the auxiliary winding Nc. The waveform of the secondary side voltage changes from positive to negative, $Vgs_{R1}$ decreases. After its voltage passes the zero, $SR_1$ turns off, and $V_{gSR2}$ increases because of the turning-on of Da. Before reaching the starting voltage, the body diode will turn on first. At t=$t_2$, the transformer has been completely demagnetized, the voltage of the secondary side reduces to zero, and the diode Da turns off. Thus, the gate voltage $V_{gSR2}$ of $SR_2$ maintains at Vin/N because there is no discharging path so that $SR_2$ sustains continuous current. When t=Ts, the main switch S turns on again, the secondary side voltage changes from zero to Vin/N. This causes the transistor Qa to turn on faster than $SR_1$ due to the accelerate circuit formed of Ra, Ca so as to ensure the rapid discharge of the gate voltage of $SR_2$. Through careful selection of Ra, Ca, Qa and the resistance of the serial connected resisters at its gate, it may reduce dramatically the cross-conductive loss, and increase the efficiency of the converter.

Due to the storage time of the Qa when turning off, the parameters of Ra and Ca can hardly properly determined when the frequency is relatively high. Accordingly, for this technology, the switching frequency is preferably lower than 250 KHz.

Figure 4B:
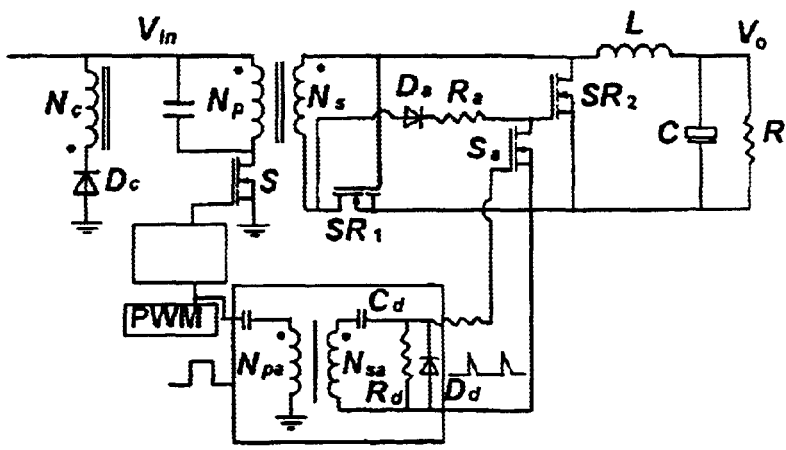
FIG. 4b is the second self-driving circuit of the present invention.

FIG. 4b illustrates the second embodiment circuit of the present invention used in a demagnetized forward stimulating circuit of three windings. In this embodiment, it utilizes a small power MOSFET, a set of an isolating differential circuit and a time delay circuit to accomplish the function of Ra, Ca, Qa of the first circuit. The structure is as follows: the anode of the diode Da is connected to the negative end of the winding Ns and the drain end of the synchronous rectifying MOS transistor ($SR_1$), and the cathode is connected, through the resister (Ra), with the gate of the synchronous rectifying MOS transistor ($SR_1$) and the drain end of the small power transistor Sa. An end of the delay driving circuit is connected with an end of the isolating differential circuit, and the other end is connected to the gate of the small power transistor Sa. Turning-on of $SR_2$ is the same as that in FIG. 4a, while its turning-off is realized by the delay circuit and the isolating differential circuit.

The isolating differential circuit may be composed of the windings Npa and Nsa of the transformer, two capacitors, two resisters and a diode. The winding Nsa is connected, through the capacitors, to the parallel-connected resisters and diode.

The time delay driving circuit is constructed by a delay circuit and a driving circuit. As an example of the delay circuit, the diode and the resister can be connected parallel, and then connected in serial with the ground capacitor.

The function of the delay circuit is to enable that $SR_2$ turns off before $SR_1$ turns on, and to control the optimum time delay so as to maximize the efficiency of the converter. This converter does not have any restriction to the frequency of switch. The size of all of the components is relatively small.

The two self-driving circuits of the present invention disclosed herein have been proved through experiments. The first circuit has been used in a DC/DC power supply (using resonant clamping forward circuit) of direct current input of 40–60 V and direct current output of 2.5V/50V. The efficiency of the power stage reaches over 90%. The second circuit has been used in a DC/DC power supply (using resonant clamping forward converting circuit) of direct current input of 37–72 V and direct current output of 5V/30V. The efficiency of the power stage exceeds 90%.

Figure 5A:
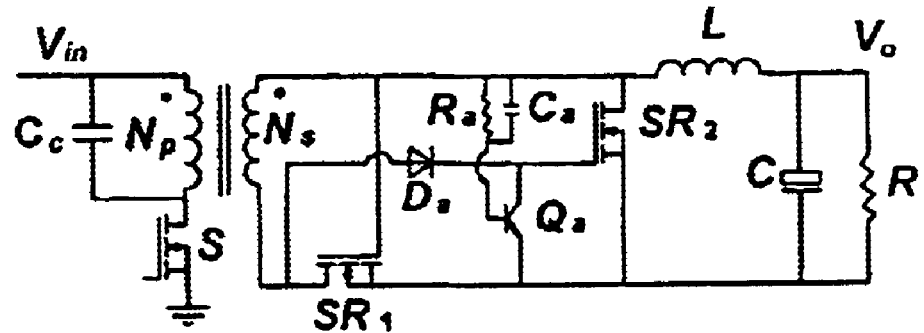
FIG. 5a is an embodiment of a resonant clamping forward converter using the first self-driving circuit.
Figure 5B:
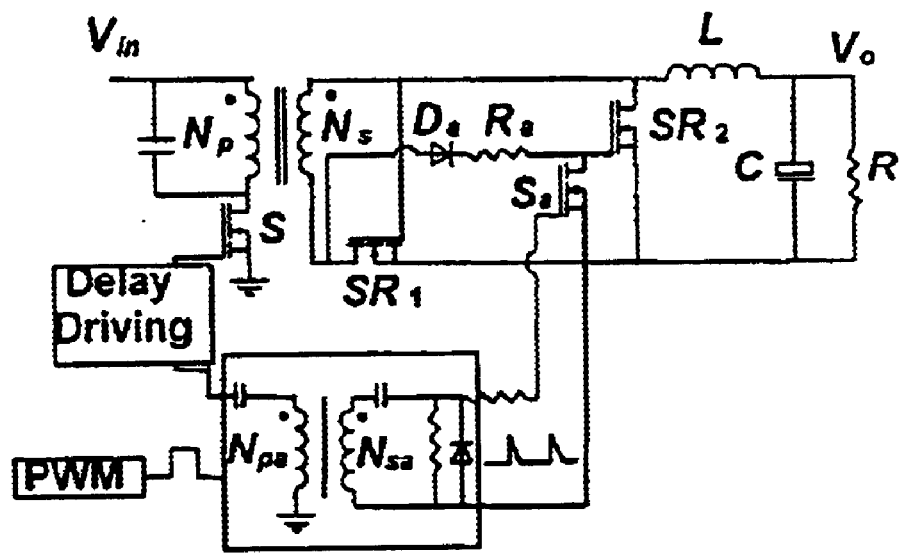
FIG. 5b is an embodiment of a resonant clamping forward converter using the second self-driving circuit.
Figure 6A:
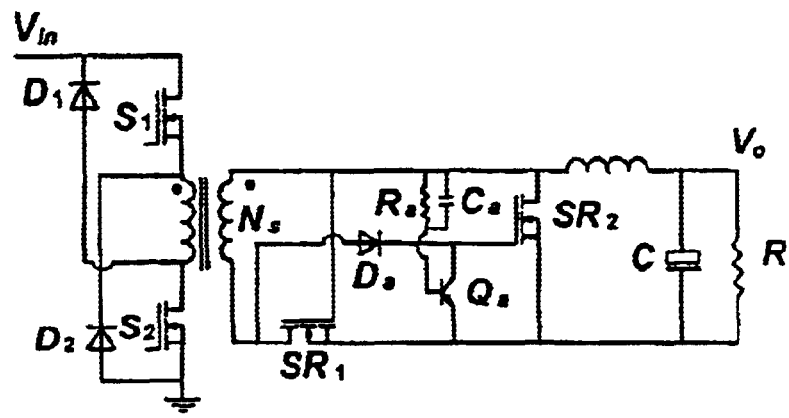
FIG. 6a is an embodiment of a diode clamping double forward converter using the first self-driving circuit.
Figure 6B:
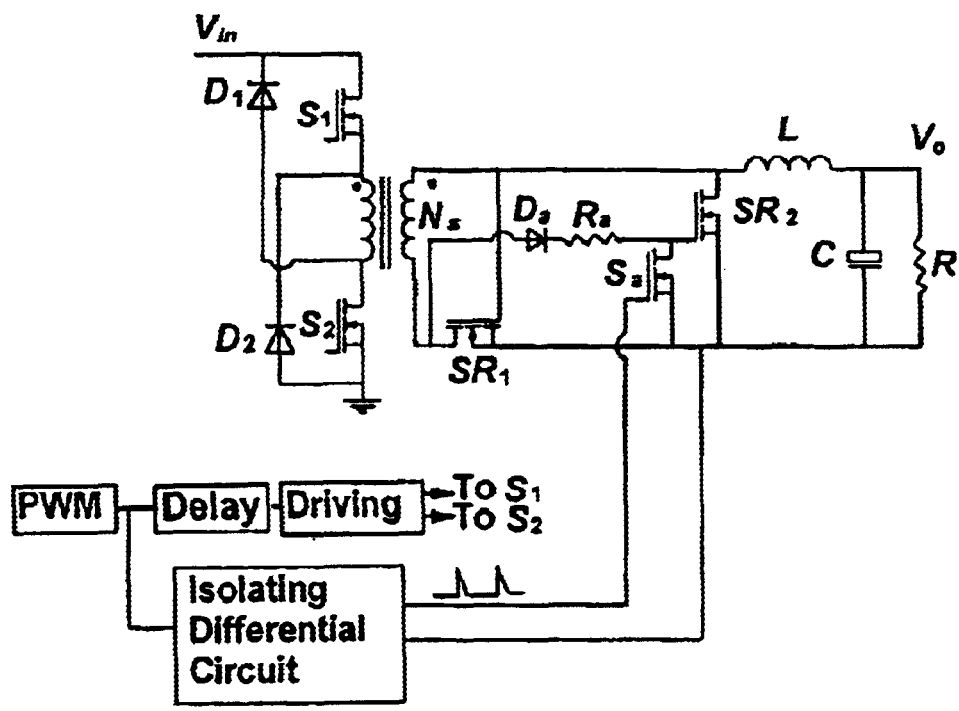
FIG. 6b is an embodiment of a diode clamping double forward converter using the second self-driving circuit.
Figure 7A:
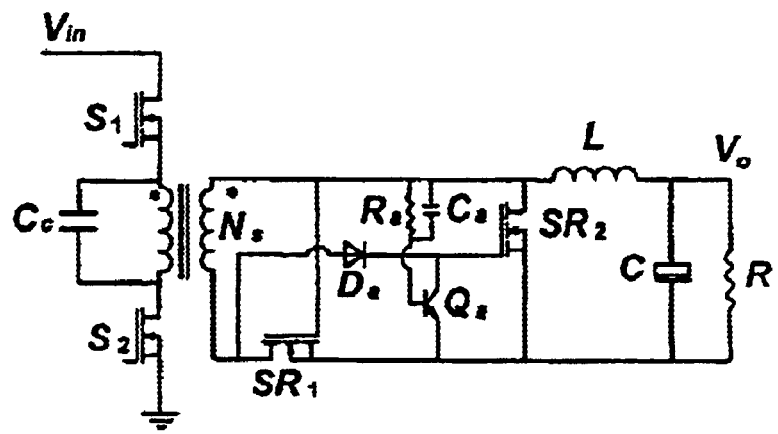
FIG. 7a is an embodiment of a resonant clamping double forward converter using the first self-driving circuit.
Figure 7B:
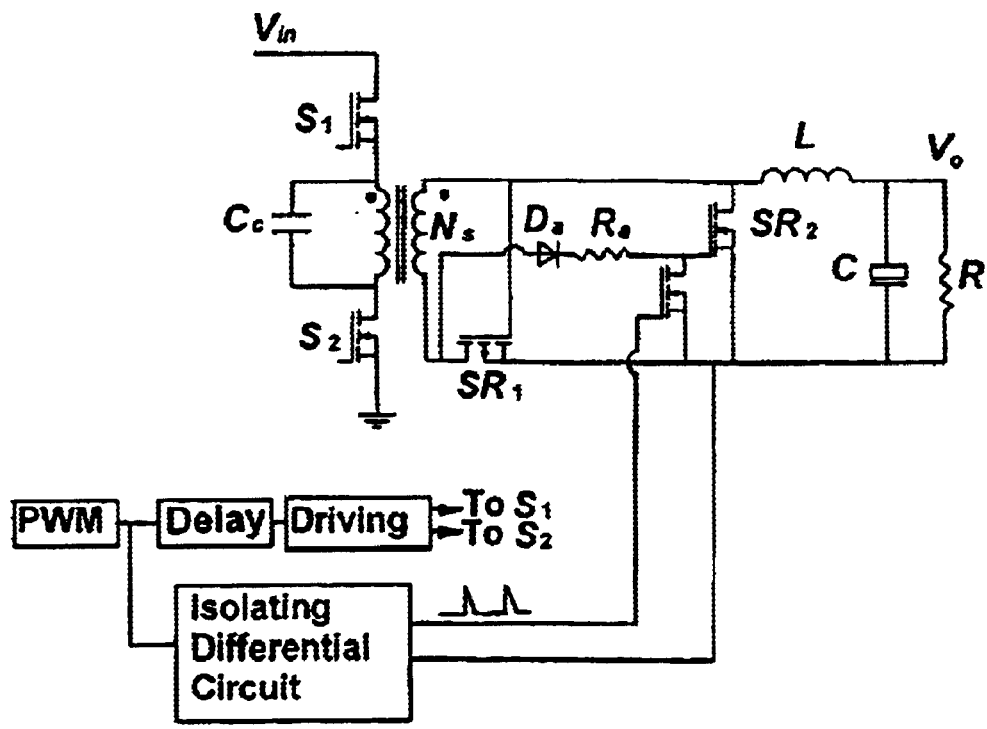
FIG. 7b is an embodiment of a resonant clamping double forward converter using the second self-driving circuit.
Figure 8A:
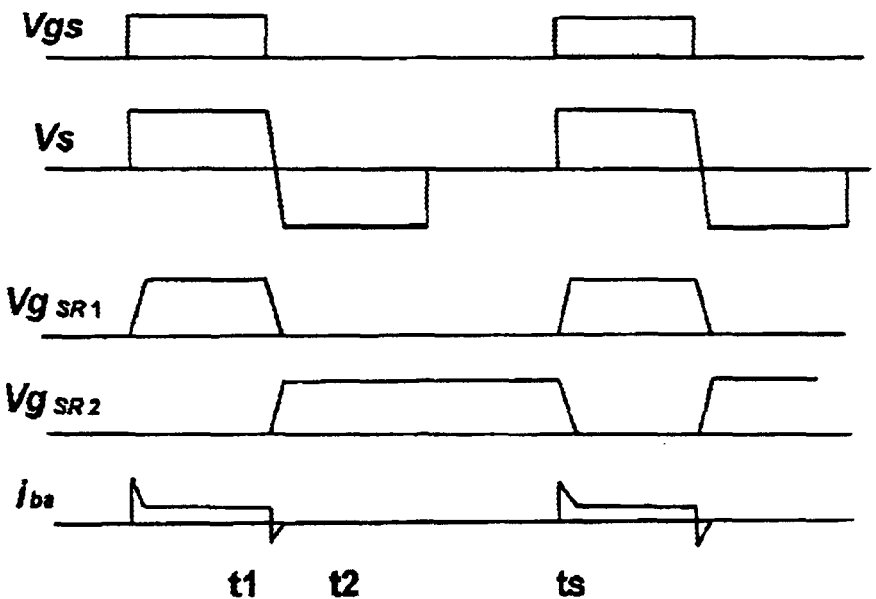
FIG. 8a shows a typical waveform of the converter using the converter of FIG. 4(a)
Figure 8B:
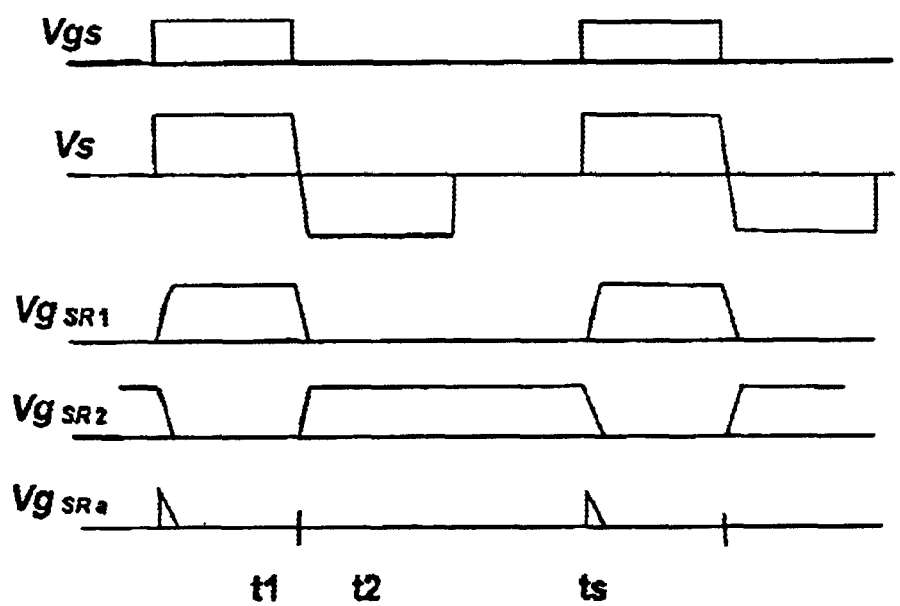
FIG. 8b shows a typical waveform of the converter using the converter of FIG. 4(b).

FIG. 5 to FIG. 7 illustrate the various application circuits using these two circuit embodiments.

FIG. 5 shows that the two self-driving circuits are used in the resonance clamping forward converter. The DC/DC converter is resonant clamping forward converter. The winding (Np) and the capacitor (Cc) are connected in parallel, and then connected to the drain end of the power MOS transistor.

FIG. 6 shows the application of the two self-driving circuits of the present invention in the diode clamping double forward stimulating circuit. The positive end of the winding (Np) is connected with the source of the power MOS transistor ($S_1$), and the negative end of the winding (Np) is connected to the drain of the power MOS transistor ($S_2$). The anode of the diode ($D_1$) is connected with the negative end of the winding (Np), and the cathode is connected with the drain end of the power MOS transistor ($S_1$). The anode of the diode ($D_2$) is connected with source of the power MOS transistor ($S_2$), and the cathode is connected with the positive end of the winding (Np).

FIG. 7 is the application of the two self-driving circuits of the present invention in the resonant clamping double forward stimulating circuit. The positive end of the winding (Np) is connected with the source of the power MOS transistor ($S_1$), and the negative end of the winding (Np) is connected to the drain of the power MOS transistor ($S_2$). The capacitor (Cc) is connected in parallel with the winding (Np), its two ends are connected, respectively, with the positive and negative ends of the winding (Np).

In the various applications in FIGS. 5–7, the function of the two self-driving circuits of the present invention is to minimize the cross loss of the MOS transistors $SR_1$ and $SR_2$, and maximize the converting efficiency.

The present invention has been explained above through the embodiments. However, the present invention is not limited thereto. Any improvement and substitution should be viewed within the scope of the protection of the present invention provided that they are not apart from the spirits and contents of the present invention.

What is claimed is:

1. A self-driving circuit of a DC/DC converter, said converter including at least a transformer having a primary winding and a secondary winding, and a rectification portion having at least a first and a second of synchronous rectifying MOS transistors, characterized in that said self-driving circuit comprises a resister, a capacitor, a transistor, and a diode, said resister and capacitor being connected in parallel, one of the ends of said parallel connection being connected with the positive end of the secondary winding, and the other connected to the base of said transistor; the emitter of said transistor being connected to the source end of the first synchronous rectifying MOS transistor, and the collector of said transistor connected with the cathode of said diode and the gate end of the second synchronous rectifying MOS transistor; and the anode of said diode being connected to the negative end of the secondary winding.

2. The self-driving circuit of claim 1, characterized in that said second synchronous rectifying MOS transistor turns off before said first synchronous rectifying MOS transistor turns on.

3. The self-driving circuit of claim 1, characterized in that said DC/DC converter is a demagnetized forward converter, which includes a third winding and a power MOS transistor in addition to said primary and secondary windings, the negative end of said primary winding is connected with the drain end of said power MOS transistor.

4. The self-driving circuit of claim 1, characterized in that said DC/DC converter is a resonant clamping forward converter, the positive end of the primary winding being connected parallel with a capacitor and then connected to the source end of a power MOS transistor.

5. The self-driving circuit of claim 1, characterized in that said converter is a diode clamping double forward converter, the positive end of the primary winding being connected with the source end of a first power MOS transistor, and the negative end of the primary winding connected with the drain end of a second power MOS transistor, said converter further including a first and a second diode, the anode of said first diode connected with the negative end of said primary winding, and the cathode connected with the drain end of said first power MOS transistor, the anode of said second diode being connected with the source end of said second power MOS transistor, and the cathode connected the positive end of said primary winding.

6. The self-driving circuit of claim 1, characterized in that said converter is a resonant clamping double forward converter, the positive end of the primary winding being connected to the drain end of a first MOS power transistor, and the negative end of the primary winding connected to the drain end of a second power MOS transistor, said resonant clamping double forward converter further including a capacitor connected in parallel with said primary winding.

7. A self-driving circuit of DC/DC converter, said converter including at least a transformer having a primary winding and a secondary winding and a rectification portion having at least a first and a second synchronous rectifying MOS transistors, characterized in that said self-driving circuit includes a first resister, a first diode, a small power MOS transistor, a delay driving circuit and an isolating differential circuit, the anode of said first diode being connected with the negative end of the secondary winding and the drain end of said first synchronous rectifying MOS transistor, and the cathode of said first diode connected, through said resister, with the gate end of said second synchronous rectifying MOS transistor and the drain end of said small power MOS transistor; one of two ends of said delay driving circuit connected with one of two ends of said isolating differential circuit; and the other end of said isolating differential circuit connected with the gate end of said small power MOS transistor.

8. The self-driving circuit of claim 7, characterized in that said isolating differential circuit includes a first winding and a second winding and a second winding of a second transformer, a first and a second capacitor, a second and a third resister and a second diode, said first capacitor being connected with said first winding, said second resister and said second diode connected in parallel, and said second winding connected, through said second capacitor, in parallel with said parallel connected second diode and second resister.

9. The self-driving circuit of claim 7, characterized in that said delay driving circuit includes a delay circuit and a driving circuit, wherein said delay circuit is comprised of a diode and a resister parallel connected, and a ground capacitor connected in serial.

10. The self-driving circuit of claim 7, characterized in that said second synchronous rectifying MOS transistor turns off before said first synchronous rectifying MOS transistor turns on.

11. The self-driving circuit of claim 7, characterized in that said DC/DC converter is a demagnetized forward converter, further including a third winding and a power MOS transistor in addition to said primary winding and secondary winding, the negative end of said primary winding being connected with the drain end of said power MOS transistor, an end of said delay driving circuit connected with an end of said isolating differential circuit, and the other end connected to the gate end of said power MOS transistor.

12. The self-driving circuit of claim 7, characterized in that said DC/DC converter is a resonant clamping forward converter, the primary winding being connected parallel with a capacitor, and then connected to the source of a power MOS transistor, an end of said delay driving circuit being connected with an end of said isolating differential circuit, and the other end connected with the gate end of said power MOS transistor.

13. The self-driving circuit of claim 7, characterized in that said DC/DC converter is a diode clamping double forward converter, the positive end of the primary winding being connected with the source of a first power MOS transistor, and the negative end of the primary winding connected with the drain end of a second power MOS transistor, said converter further including a first and a second diode, the anode of said first diode being connected with the negative end of said primary winding, and the cathode connected with the drain end of said first power MOS transistor, the anode of said second diode being connected with the source end of said second power MOS transistor, and the cathode connected with the positive end of said primary winding, said delay driving circuit connected with an end of the isolating differential circuit, and the other end connected with the gate end of said first and second power MOS transistor, respectively.

14. The self-driving circuit of claim 7, characterized in that said DC/DC converter is a resonant clamping forward converter, the positive end of the primary winding being connected with the source end of a first power MOS transistor, and the negative end of the primary winding connected with the drain end of a second power MOS transistor, said converter further including a capacitor connected parallel with said primary winding, and the two ends of the parallel connection connected, respectively, with the positive and negative ends of said primary winding, an end of said delay driving circuit being connected with an end of the isolated differential circuit, and the other end connected, respectively, with the gate ends of said first and second power MOS transistors.

* * * * *